June 25, 1957    V. J. JANDASEK    2,796,736
HYDRAULIC TORQUE CONVERTER
Filed Feb. 18, 1954
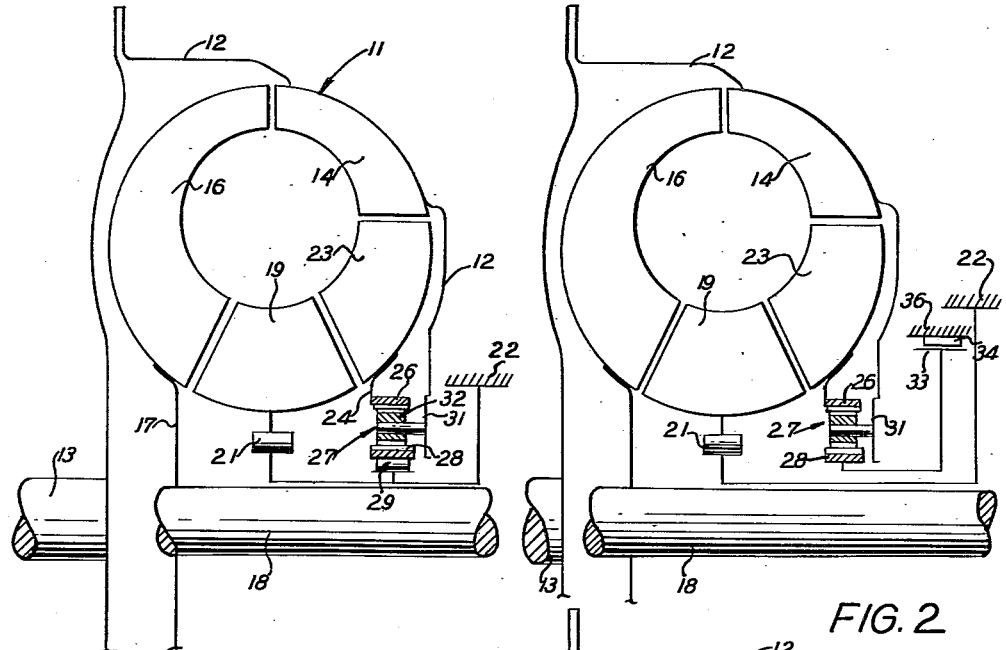
FIG. 1
FIG. 2
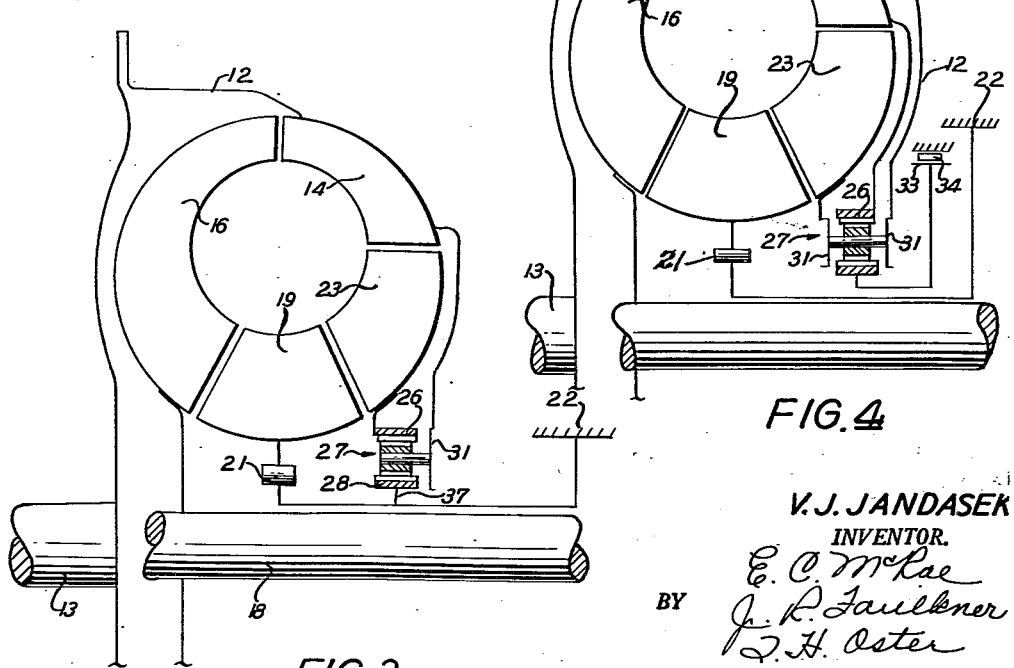
FIG. 3
FIG. 4
V. J. JANDASEK
INVENTOR.
BY E. C. McRae
J. R. Faulkner
J. H. Oster
ATTORNEYS United States Patent Office 2,796,736
Patented June 25, 1957

2,796,736

HYDRAULIC TORQUE CONVERTER

Vladimir J. Jandasek, Detroit, Mich., assignor to Ford Motor Company, Dearborn, Mich., a corporation of Delaware Application February 18, 1954, Serial No. 411,053

4 Claims. (Cl. 60—54)

This invention relates generally to hydraulic torque converters.

Hydraulic torque converters of the type used in automatic transmissions for motor vehicles conventionally have a single impeller driven by the engine crankshaft. In a few instances, however, torque converters having more than one impeller have been used. For example, in one type of torque converter an auxiliary impeller is utilized which has blading so designed that the auxiliary impeller runs freely or floats in the hydraulic circuit and is picked up by the primary impeller at a certain point in the operation of the device and thereafter rotated with the primary impeller as a unit. In other constructions multiple impellers have been provided, all driven directly by the engine crankshaft and separated from each other by intermediate turbines. The torque converter of the present invention differs from the foregoing constructions in that it embodies a plurality of impellers arranged immediately adjacent each other in the converter and each arranged to be positively driven from the engine crankshaft at different speeds. An object of this construction is to provide a hydraulic torque converter which increases the circulation of fluid within the converter and increases the torque transmitting capacity of the unit. In other words, at a given speed the torque converter of this improved design will transmit greater torque than a corresponding unit of conventional design. As a result, for a given amount of torque being transmitted the converter of the present invention will have less slip than a corresponding conventional torque converter, and will achieve greater efficiency.

The invention contemplates providing a torque converter having adjacent primary and auxiliary impellers with the primary impeller being driven directly by the driving shaft of the converter and at the same speed thereof, and with the auxiliary impeller being driven by step-up gearing, as of the planetary type, to drive the auxiliary impeller at a speed faster than the speed at which the primary impeller is driven. The arrangement may be such that a definite predetermined speed ratio exists between the primary and auxiliary impellers. The step-up gearing may take the form of a planetary gear set having its planet carrier driven by the primary impeller or by the converter driving shaft, a ring gear connected to the auxiliary impeller, and a sun gear anchored to the housing so as to positively drive the auxiliary impeller at a speed faster than the primary impeller.

A further object of the invention is to provide a torque converter of the type described, having a plurality of impellers driven at different speeds, in which the primary impeller is constantly driven but in which the auxiliary impeller is driven only under certain conditions and at other times run freely or floats in the hydraulic circuit. For example, an overrunning brake may be provided between the planetary gear set sun gear and the housing to permit the auxiliary impeller to overrun at stall and in the lower speed ratios but to be positively driven at a higher speed in the higher speed ratios. Alternatively, the sun gear may be selectively anchored to the housing by means of a suitably controlled friction band to enable the drive to the auxiliary impeller to be controlled as desired, as for example to be effective in certain predetermined ranges of speed and/or load. The construction is also operative to provide an improved unit when the auxiliary impeller is driven at all times at its higher speed, in which case the blades are so designed as to assist the primary impeller at higher speed ratios while not appreciably interfering with the normal converter functions at stall or low speed ratios.

Other objects and advantages of this invention will be made more apparent as this description proceeds, particularly when considered in connection with the accompanying drawings, wherein:

Figure 1 is a diagrammatic view of a hydraulic torque converter incorporating the present invention.

Figures 2, 3, and 4 are diagrammatic views similar to Figure 1 but showing modifications.

Referring now to the drawings, and particularly to Figure 1, the reference character 11 indicates a torque converter having a housing 12 directly connected to the crankshaft 13 of the vehicle engine.

The housing 12 forms the outer shroud for the blades of a primary impeller 14, and it will be apparent that the primary impeller is thus driven directly from the engine crankshaft 13 at the speed thereof. A conventional turbine 16 is provided with a hub 17 suitably connected to the driven shaft 18 of the converter. The converter also includes a conventional stator 19 connected by means of an overrunning brake 21 to a fixed portion 22 of an outer stationary housing. The overrunning brake 21 enables the stator 19 to overrun when the coupling point of the converter is reached so that the converter will function thereafter as a fluid coupling.

Also mounted for rotation within the housing 12 of the torque converter is a secondary or auxiliary impeller 23. The auxiliary impeller 23 is located immediately adjacent the primary impeller 14, between the primary impeller and the stator 19. It is mounted upon a hub 24 which in turn is secured to the ring gear 26 of a planetary gearset 27. The sun gear 28 of the planetary gearset is connected by means of an overrunning brake 29 to a stationary portion 22 of the converter housing. The planet carrier 31 of the planetary gearset carries a plurality of planet pinions 32 meshing with the ring gear 26 and the sun gear 28, and is carried by the lower portion of the housing 12 of the torque converter.

From the foregoing it will be seen that, except when permitted to overrun by means of the overrunning brake 29, the auxiliary impeller 23 is positively driven from the engine crankshaft 13 through the converter housing 12 and the planetary gearset 27 at a speed faster than the speed of the crankshaft, and consequently at a speed faster than the speed at which the primary impeller 14 is driven. The planetary gearset establishes a predetermined speed ratio between the primary and auxiliary impellers, and may be designed so as to achieve the desired speed ratio therebetween.

The incorporation of the auxiliary impeller 23 into the hydraulic circuit of the torque converter with the auxiliary impeller being driven at a speed faster than the speed of the primary impeller provides additional circulation of fluid within the converter and increases the torque transmitting capacity of the converter. This permits the transmittal of a greater torque for any given speed of the engine crankshaft 13, and results in permitting a given torque to be transmitted by the converter with less slip than with a conventional converter. This increased torque capacity and resultant reduced slip is particularly desirable at the higher speed ratios between the driving and driven shafts of the converter, such as under road load conditions. With the construction shown in Figure 1 the blading of the auxiliary impeller 23 is such that at stall and in the lower speed ratios the auxiliary impeller normally overruns and runs freely in the hydraulic circuit of the converter. At higher speed ratios, however, the planetary gearset 27 will drive the auxiliary impeller 23, thereby automatically increasing the capacity of the converter.

Figure 2 illustrates a modification of the invention, differing from the construction shown in Figure 1 primarily in the elimination of the overrunning brake 29 and the provision in lieu thereof of a brake drum 33 and friction band 34 to permit selective control of the auxiliary impeller 23. The brake drum 33 is connected to the sun gear 28 of the planetary transmission 27 and rotates therewith as a unit. The friction band 34 encircles the brake drum 33 and is conventionally connected to the portion 36 of the outer stationary housing. Suitable controls (not shown) may be provided to actuate the friction band 34 and to cause it to engage the brake drum 33 to lock the latter to the housing and to thus hold the sun gear 28 against rotation. When the friction band is thus engaged with the drum the planetary gearset 27 is effective to drive the auxiliary impeller 23 at a speed greater than the speed at which the primary impeller 14 is driven. With this arrangement the auxiliary impeller can be incorporated into the hydraulic circuit in certain predetermined ranges of speed and/or load to provide the desired increased torque capacity and reduced slip.

Figure 3 illustrates another modification of the invention, differing from the constructions shown in Figures 1 and 2 in that the sun gear 28 of the planetary gearset 27 is connected at 37 to the converter housing 22 to hold the sun gear 28 stationary and to drive the auxiliary impeller 23 at all times at the increased speed. With this arrangement the blades of the auxiliary impeller may be designed to assist the primary impeller during the higher speed ratios while not appreciably interfering with the normal converter functions at stall and at the lower speed ratios.

Figure 4 illustrates a modification in which the auxiliary impeller 23 is driven directly from the crankshaft 13 through the housing 12 and the planet carrier 31. The primary impeller 14 is connected to the ring gear 26 of the planetary gearset 27, while the sun gear 28 may be selectively locked against rotation by means of the brake drum 33 and friction band 34. When the sun gear is thus locked the primary impeller 14 is driven at a speed faster than the speed at which the auxiliary impeller 23 is driven.

If desired the two impellers of the torque converter may be driven by means other than a planetary gearset connected therebetween, the planetary gearset being but one form of drive mechanism for driving one impeller at a speed faster than the speed at which the other impeller is driven so as to provide increased torque capacity for the converter with accompanying reduced slip.

It will be understood that the invention is not to be limited to the exact construction shown and described, but that various changes and modifications may be made without departing from the spirit and scope of the invention, as defined in the appended claims.

What is claimed is:

1. In a hydraulic torque converter for transmitting power from a driving shaft to a driven shaft, a stationary housing, a primary impeller within said housing connected to said driving shaft and driven thereby at the speed of said driving shaft, a turbine connected to said driven shaft to drive the latter, a stator anchored to said housing against reverse rotation, an auxiliary impeller immediately adjacent said primary impeller, and a planetary gearset between said driving shaft and said auxiliary impeller to drive the latter at a speed faster than the speed at which said primary impeller is driven, said planetary gearset having a ring gear connected to said auxiliary impeller and a sun gear connected to said housing.

2. In a hydraulic torque converter for transmitting power from a driving shaft to a driven shaft, a stationary housing, a primary impeller within said housing connected to said driving shaft and driven thereby at the speed of said driving shaft, a turbine connected to said driven shaft to drive the latter, a stator anchored to said housing against reverse rotation, an auxiliary impeller immediately adjacent said primary impeller, and a planetary gearset between said driving shaft and said auxiliary impeller, said planetary gearset having a ring gear connected to said auxiliary impeller, a sun gear, means for anchoring said sun gear to said housing, and a planet carrier driven by said driving shaft and supporting planet pinions meshing with said ring and sun gears to drive the auxiliary impeller at a speed faster than the speed at which said primary impeller is driven.

3. A hydraulic torque converter for transmitting power from a driving shaft to a driven shaft at varying torque ratios, comprising a stationary housing, a primary impeller within said housing driven directly by said driving shaft at the speed thereof, a turbine within said housing connected to said driven shaft to drive the latter, a stator within said housing, an auxiliary impeller within said housing immediately adjacent said primary impeller, a planetary gearset arranged to drive said auxiliary impeller at a speed faster than the speed at which said primary impeller is driven, said planetary gearset having one element thereof connected to said primary impeller and a second element thereof connected to said auxiliary impeller, an overrunning brake connecting the third element of said planetary gearset to said housing, and an overrunning brake connecting said stator to said housing independently of any of the elements of said planetary gearset.

4. In a hydraulic torque converter having a driving shaft, a driven shaft and a stationary housing, a stator, a turbine connected to said driven shaft to drive the latter, a pair of adjacent impellers between said turbine and said stator, means for driving one of said impellers from said driving shaft at the speed of said driving shaft, step up gearing for driving the other of said impellers at a definite predetermined speed relationship with respect to said one impeller and at a greater absolute speed than said one impeller, and an overrunning brake, said stator being directly connected to said housing through said overrunning brake independently of any of the elements of said gearing, a separate element of said gearing being connected to each of said impellers.

References Cited in the file of this patent

UNITED STATES PATENTS 2,280,015     Tipton _____ Apr. 14, 1942